United States Patent
Vatin

(10) Patent No.: US 10,794,201 B2
(45) Date of Patent: Oct. 6, 2020

(54) METHOD FOR ASSEMBLING TURBOMACHINE PARTS AND ASSEMBLY USED DURING SUCH A METHOD

(71) Applicant: SAFRAN AIRCRAFT ENGINES, Paris (FR)

(72) Inventor: Eric Raymond Jean Vatin, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 348 days.

(21) Appl. No.: 14/904,335

(22) PCT Filed: Jul. 17, 2014

(86) PCT No.: PCT/FR2014/051832
§ 371 (c)(1),
(2) Date: Jan. 11, 2016

(87) PCT Pub. No.: WO2015/007994
PCT Pub. Date: Jan. 22, 2015

(65) Prior Publication Data
US 2016/0153298 A1 Jun. 2, 2016

(30) Foreign Application Priority Data

Jul. 18, 2013 (FR) ...................... 13 57078

(51) Int. Cl.
*F01D 9/04* (2006.01)
*F16B 11/00* (2006.01)

(52) U.S. Cl.
CPC ............. *F01D 9/044* (2013.01); *F01D 9/042* (2013.01); *F05D 2230/23* (2013.01);
(Continued)

(58) Field of Classification Search
CPC .... F01D 9/044; F01D 9/042; F05D 2300/501; F05D 2240/80; F05D 2240/12;
(Continued)

(56) References Cited

U.S. PATENT DOCUMENTS 4,594,761 A * 6/1986 Murphy ................. B23P 15/04
29/418
8,794,908 B2 * 8/2014 Dezouche ............... F01D 9/042
415/119
(Continued)

FOREIGN PATENT DOCUMENTS

EP 2 586 989 A1 5/2013
FR 2 958 323 A1 10/2011

OTHER PUBLICATIONS

International Search Report dated Sep. 30, 2014 in PCT/FR2014/051832 filed Jul. 17, 2014.
(Continued)

*Primary Examiner* — Michael N Orlando
*Assistant Examiner* — Christian Roldan
(74) *Attorney, Agent, or Firm* — Oblon, McClelland, Maier & Neustadt, L.L.P.

(57) ABSTRACT

A method for assembly of a first turbomachine part with at least one second turbomachine part, including an injection of a vulcanisable elastomer, preferably a silicone that can be vulcanised at ambient temperature called an RTV silicone, in an injection zone at the junction between the first and the second parts; local heating of the injection zone so as to vulcanise the vulcanisable elastomer.

10 Claims, 3 Drawing Sheets

(52) U.S. Cl.
CPC ...... *F05D 2230/60* (2013.01); *F05D 2240/12* (2013.01); *F05D 2240/80* (2013.01); *F05D 2300/437* (2013.01); *F05D 2300/501* (2013.01); *F16B 11/006* (2013.01)

(58) Field of Classification Search
CPC ............. F05D 2230/60; F05D 2230/23; F05D 2300/437; F16B 11/006
USPC .......................................................... 156/60
See application file for complete search history.

(56) References Cited

U.S. PATENT DOCUMENTS

2011/0243742 A1    10/2011   Dezouche et al.
2013/0108427 A1*   5/2013   Brassine ................ B29C 45/16
                                                        415/200

OTHER PUBLICATIONS

French Search Report dated Dec. 16, 2013 in FR 1357078 filed Jul. 18, 2013.

* cited by examiner

1

METHOD FOR ASSEMBLING TURBOMACHINE PARTS AND ASSEMBLY USED DURING SUCH A METHOD

TECHNICAL DOMAIN

The invention relates to the domain of assembling turbomachine parts.

Manufacturing of a turbomachine necessarily involves several assembly steps some of which are particularly time and energy consuming.

Thus the invention relates to a method for assembling turbomachine parts and an assembly used during this assembling method.

STATE OF PRIOR ART

It is known that vulcanisable elastomers such as silicone that can be vulcanised at ambient temperature can be used to assemble two turbomachine parts.

Such an assembly is usually obtained by using a method for the assembly of turbomachine parts comprising steps to:
assemble the first and the second parts on a support;
inject a vulcanisable elastomer such as a silicone that can be vulcanised at ambient temperature, at a chosen injection zone at the junction of the first part and the second part;
place the support and the first part and the second part in an drying oven at 100° C. for a duration usually lasting about 1 hour;
cool the support and the first part and the second part;
disassemble the assembly of the first part and the second part.

Although such a method can vulcanise the elastomer faster than vulcanisation at ambient temperature, it has a number of disadvantages. The use of a drying oven to heat the support and the two parts is particularly energy consuming when the parts to be assembled are large and particularly heavy. Moreover, the time necessary to cool this type of heavy part can exceed 2 hours and even 4 hours. Finally, it should be noted that the operator must put the support and all the parts to be assembled in the drying oven and then remove them. These operations can be particularly difficult for the operator when these parts are heavy and large.

Prior art also includes the method of performing the heating step using a warm chamber instead of a drying oven. Such a warm chamber is formed by a cover of the support or a blanket placed on the support. The cover or the blanket includes a heating system to heat the support and all the parts to be assembled so as to vulcanise the elastomer.

Nevertheless, although such a warm chamber system limits handling problems for the support and all the parts to be assembled, problems related to energy used to achieve this vulcanisation and heating and cooling times remain unchanged.

It should be noted that the problems mentioned above particularly exist in the case of an assembly of a guide vane from an inner shell and an outer shell on which the vanes have already been fixed, due to the mass and dimensions of the inner and outer shells.

PRESENTATION OF THE INVENTION

The invention aims at overcoming these disadvantages.
One purpose of the invention is to disclose an assembly method including a vulcanisation step with a lower energy consumption than assembly methods according to prior art that include a vulcanisation step.

Another purpose of the invention is to disclose an assembly method with a vulcanisation step, for which the duration of the cooling step is shorter than it is for assembly methods according to prior art that include a vulcanisation step.

To achieve this, the invention relates to a method for assembly of a first turbomachine part with at least one second turbomachine part, comprising the following steps:
injection of a vulcanisable elastomer, preferably a silicone that can be vulcanised at ambient temperature called an RTV silicone, in an injection zone at the junction between the first and the second parts,
local heating of the injection zone so as to vulcanise the vulcanisable elastomer.

A <<Local heating of the injection zone so as to vulcanise the vulcanisable elastomer>> step is a step in which heating is done so as to provide local heating in the injection zone and thus prevent overheating of the first part and the second part.

Thus, due to the use of such an assembly method, all that is necessary is to provide the energy necessary to heat the injection zone only, without overheating the first and the second parts. The result is much lower energy consumption than methods according to prior art, together with shorter heating and cooling times.

The first part and the second parts may be two annular parts that will form a turbomachine guide vane after assembly.

The first part may be an inner shell of the guide vane, the second part being formed from an outer shell on which vanes have already been assembled.

The first part may be an inner shell of the guide vane, the second parts being vanes.

Such methods are particularly advantageous for such parts due to the particularly large mass of parts used in a guide vane. Therefore, the energy and assembly time benefits are particularly advantageous.

The local heating step can be implemented using an assembly comprising a support for the first part and the second parts and a local heating system comprising a heating zone and that is associated with the support such that the heating zone is facing the injection zone while the heating step is being performed.

Such an assembly can provide particularly efficient local heating because the heating zone is directly facing the injection zone.

The assembly can also act as an assembly support used during the elastomer injection step.

Thus, there is no need to handle the assembly composed of the first part and the second part after injection. This results in a time saving and elimination of a step that is particularly difficult for the operator.

The local heating step may be implemented through the use of a heating element previously placed on the two parts of the turbomachine close to the injection zone.

Such a heating element can perform the local heating step directly on a conventional assembly support used during the injection step, therefore without it being necessary to disassemble the assembly formed by the first part and the second part.

During the local heating step, the heating element may be in contact either with the first or the second part of the turbomachine, said part among the first and the second parts having a surface facing the injection zone.

The local heating step can be implemented using a heating system external to the support such as a hot air blowing system at the injection zone, laser radiation or microwave radiation.

With such external heating systems, the local heating step can be performed with parts that remain in position on a conventional assembly support used during the injection step, therefore without it being necessary to disassemble the assembly formed from the first and the second parts.

The invention also relates to an assembly for assembling a first turbomachine part with at least a second turbomachine part by injection and vulcanisation of a vulcanisable elastomer in an injection zone at the junction of the first and the second parts, said assembly comprising a support and a local heating system, the local heating system comprising a heating zone, said support and said heating system being associated such that the heating zone faces the injection zone once the first part and the second part have been assembled.

Such an assembly can provide a means of assembling the first part on the second part that can be used during the step to inject the vulcanisable elastomer and the local heating step.

The local heating system includes, for furnishing the heating surface, a heating means selected among the group comprising a circuit carrying a heating liquid, a heating resistance, a Peltier effect system and an induction coil.

Such heating means provide local heating that requires a relatively small volume for its installation and therefore that can easily be integrated in an assembly according to the invention.

The heating system may be integrated into the support, for example by forming an annular centring wall designed and arranged to centre the assembly formed by the first part and the second part.

The support may comprise a base from which an annular support wall of the local heating system extends, the local heating system being installed along the annular wall and being sized and arranged to centre the assembly with the heating zone facing the injection zone.

The support can include the heating system in a centring wall of the assembly.

The complete assembly may form a support for the assembly of a turbomachine guide vane.

BRIEF DESCRIPTION OF THE DRAWINGS

This invention will be better understood after reading the detailed description of example embodiments given purely for information and that are in no way limitative, with reference to the appended drawings in which.

Identical, similar or equivalent parts in the different figures have the same numeric references to facilitate comparison between the different figures.

The different parts shown in figures are not necessarily all at the same scale, to make the figures more easily legible.

The different possibilities (variants and embodiments) must be understood as not being mutually exclusive and they can be combined with each other.

DETAILED PRESENTATION OF PARTICULAR EMBODIMENTS

Figure 1:
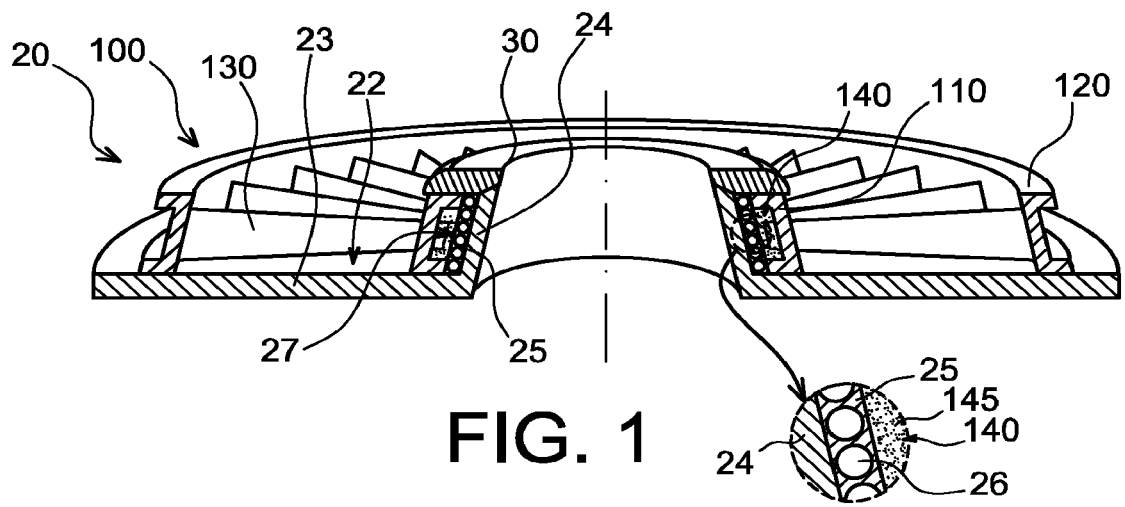
FIG. 1 shows an assembly used during an assembly method according to a first embodiment of the invention in which heating is provided by a heat conveying liquid, the two parts to be assembled being arranged on the assembly.

FIG. 1 shows an assembly 20 for assembling a turbomachine guide vane 100 starting from an inner shell 110 and an outer shell 120 on which vanes 130 have previously been mounted.

Such an assembly 20 is used during assembly of a guide vane 100 comprising steps to:
install the outer shell 120 on the inner shell 110 with ends of vanes 130 opposite the outer shell 120 housed in the corresponding orifices in the inner shell 110;
place the inner shell 110/outer shell 120 assembly on the assembly 20;
place an injection cover 30 on the assembly 20 to close off an injection zone 140 at the junction of the inner shell 110 and vanes 130 installed on the outer shell 120;
inject a silicone 145 that can be vulcanised at ambient temperature, better known under the term RTV silicone;
locally heat the injection zone 140 so as to vulcanise the silicone 145 and seal the vanes 130 on the inner shell 110 and seal the junction between the vanes 130 and the inner shell 110.

Such a method of assembling a guide vane 100, except for the local heating step, is disclosed in French patent FR 2958323. This is why specific features of steps other than the local heating step will not be described in more detail in this document.

Such an assembly method can be used for sealing vanes 130 in the inner shell 110 while providing an abradable seal function for the rotor/stator assembly of the turbomachine.

The assembly 20 comprises an assembly support 22 and a centring and heating ring 25.

The support 22 comprises a base 23 and an annular support wall 24 for the ring 25. The base 23 is generally in the shape of a disk for which the outside diameter is greater than or equal to the diameter of the outer shell 120. The annular wall 24 is in the form of a cylindrical envelope that extends from the base 23 transverse to the base 23 with an outside diameter less than the outside diameter of the inner shell 110.

The ring 25 is adapted to be mounted radially outside the annular wall 24 and to achieve this, it has an inner profile complementary to the outer profile of the annular wall 24. Thus, the inside diameter of the ring 25 is slightly larger than the outside diameter of the annular wall 24. The outer profile of the ring 25 opposite the annular wall 24 is adapted as a function of injection constraints in order to apply the required shape on the silicone 145 when it is injected. The same outer profile of the ring 25 also performs a guide function for the inner shell 110 so as to centre it during its placement on the assembly 20. In this way, the ring can centre the inner shell 110 assembly relative to the outer shell 120 as it is placed on the assembly 20.

It should be noted that according to one possibility of the invention, a same support 22 may be associated with several rings 25, each ring 25 having an outer profile corresponding to a type of guide vane 100. Such a possibility makes it possible to use a single support 22 for the assembly of several types of guide vanes 100.

The ring 25 comprises a heating device 26 consisting of a heat conveying liquid circuit. The heating device 26 is built into the ring 25 such that it delimits a heating zone 27 facing the injection zone 140, when the assembly 20 supports the inner shell 110/outer shell 120 assembly.

The heating device 26 forms a heating means while the ring 25 forms a local heating system.

According to one possibility of the invention not shown, the ring 25 may also include a temperature measurement system such as a thermocouple. Such a temperature measurement system is particularly advantageous to check that the heating device 26 applies heat to the injection zone 140 correctly and therefore vulcanises the silicone 145.

According to one advantageous possibility not shown, the ring 25 may be formed from two different materials, one being a thermal insulating material that in particular forms the inner surface of the ring that is in contact with the support 22, the other being a heat conducting material such that the ring 25 has a heating zone 27 with a relatively homogeneous temperature.

The injection cover 30 is placed on the assembly 20 after the inner shell 110 and the outer shell 120 have been assembled. In this way, the injection cover 30 closes off the injection zone 140. The injection zone 140 is then delimited by the outside surface of the ring 25, the inner shell 110 and the injection cover 30. The injection zone 140 and the shape of the seal formed during this injection are perfectly defined.

With such an assembly 20 according to this first embodiment, heat conveying liquid heated at temperature is circulated in the heat conveying circuit during the local heating step to bring the heating surface 27 to a temperature and to vulcanise the injected silicone 145. Thus, in the special case of RTV silicone, the heat conveying liquid may for example be at a temperature of 60° C. and it may be circulated in the heat conveying liquid circuit for an approximately 30-minute period during the local heating step.

With such a heating device 26, it is also possible to use the heat conveying circuit to provide active cooling to the injection zone 140. After circulation of a heat conveying liquid during the local heating step, a liquid with a temperature lower than the temperature of the injection zone 140 can be circulated to obtain active cooling.

Figure 2:
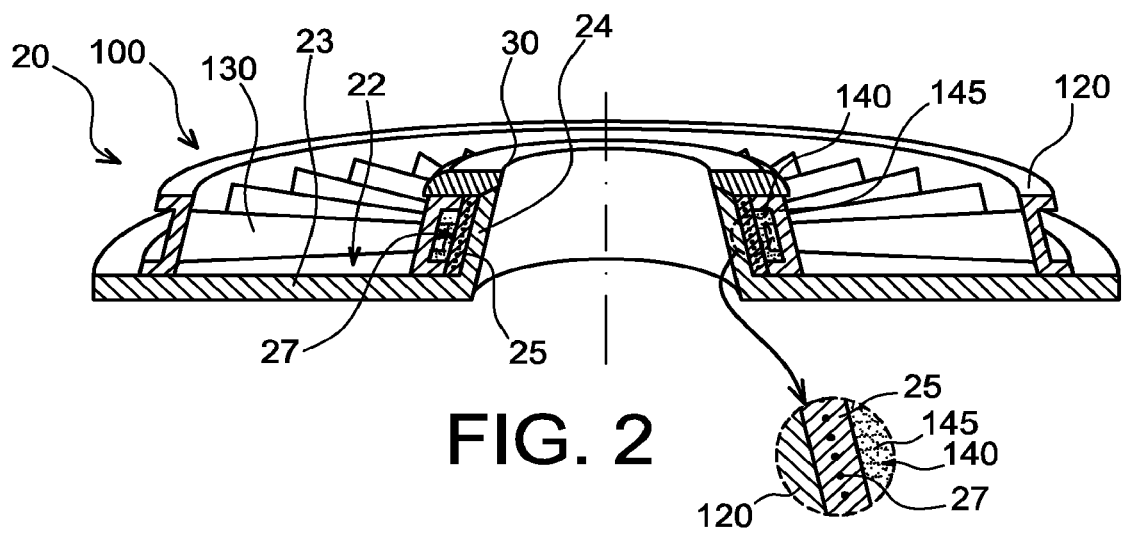
FIG. 2 shows an assembly used during an assembly method according to a second embodiment of the invention in which heating is provided by a heating resistance, two parts to be assembled being placed on the assembly.

FIG. 2 shows an assembly 20 according to a second embodiment of the invention in which the heating device 26 is a resistive heating circuit. Such an assembly is different from an assembly 20 according to the first embodiment in that the heat conveying liquid circuit is replaced by a resistive heating circuit.

Such an assembly 20 is also different in its application, since this latter assembly 20 cannot be adapted to provide active cooling of the injection zone 140 after the local heating step.

According to other possibilities not shown, the heating device 26 may also be a Peltier effect system or an induction coil. In a manner similar to the heat conveying circuit, a Peltier system can be adapted to provide active cooling. In the case of an induction coil built into the ring 25, an inductive current generator is also necessary to generate current in the induction coil.

According to one possibility of these first two embodiments, the assembly may comprise a single support 22, the annular wall 24 being adapted to perform the guidance and centring function of the inner shell 110/outer shell 120 assembly and comprising the heating device 27 so as to provide the heating zone facing the injection zone.

Figure 3:
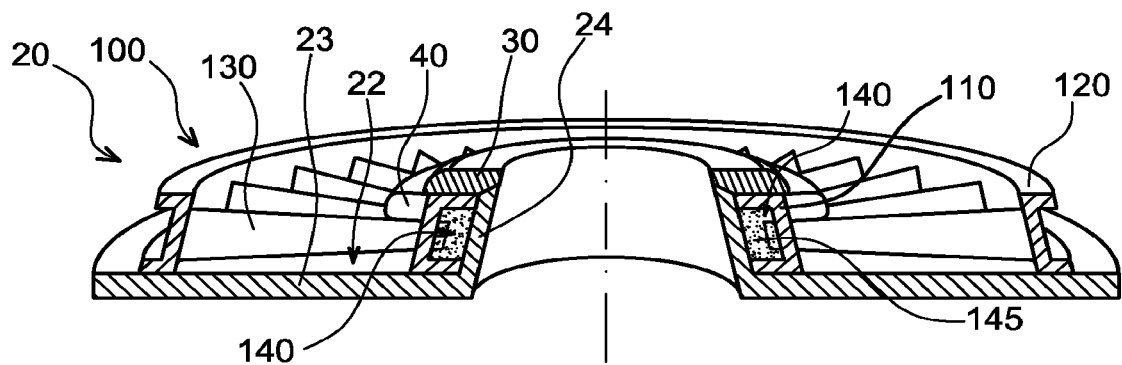
FIG. 3 shows a local heating step of an assembly method according to a third embodiment in which a heating strip is used.

FIG. 3 shows a local heating step of an assembly method according to a third embodiment in which local heating is provided by a heating element 40 placed on the vanes 130 close to the injection zone 140. The heating element 40 must be placed sufficiently close to the injection zone 140 to provide local heating of the injection zone 140. An assembly method according to this third embodiment is different from a method according to the first embodiment in that it does not use a ring 25 and in that the heating step uses a heating element 40 rather than a heat conveying circuit 26 built into a ring 25.

Therefore in this third embodiment, the assembly 20 comprises only the assembly support 22. The annular wall 24 is configured for guiding and centring the inner shell 110 so as to centre the inner shell 110/outer shell 120 assembly during its placement on the assembly 20. Similarly, the profile of the outside surface of the annular wall 24 is adapted as a function of injection constraints in order to apply the required shape on the silicone 145 when it is injected.

In this third embodiment, the heating element 40 is a heating strip for which the temperature is preferably controlled to an appropriate temperature to vulcanise the silicone 145. For example, this temperature could be 60° C. in the case of an RTV silicone.

The local heating step according to this third embodiment comprises the following sub-steps:
  placement of the heating element 40 on the vanes 130 close to the injection zone 140,
  use of the heating element 40 so as to locally heat the injection zone 140.

During placement of the heating element 40 on the vanes 130, this heating element is put into contact with the inner shell 110 that has a surface area facing the injection zone 140. Thus, during placement of the heating element, a large proportion of the heat transmitted by the heating element 40 to the inner shell 110 is applied to the injection zone 140 by the surface of the inner shell 110 that is facing the injection zone 140. Application of heat in this way can provides a local heating of the injection zone 140.

Figure 4:
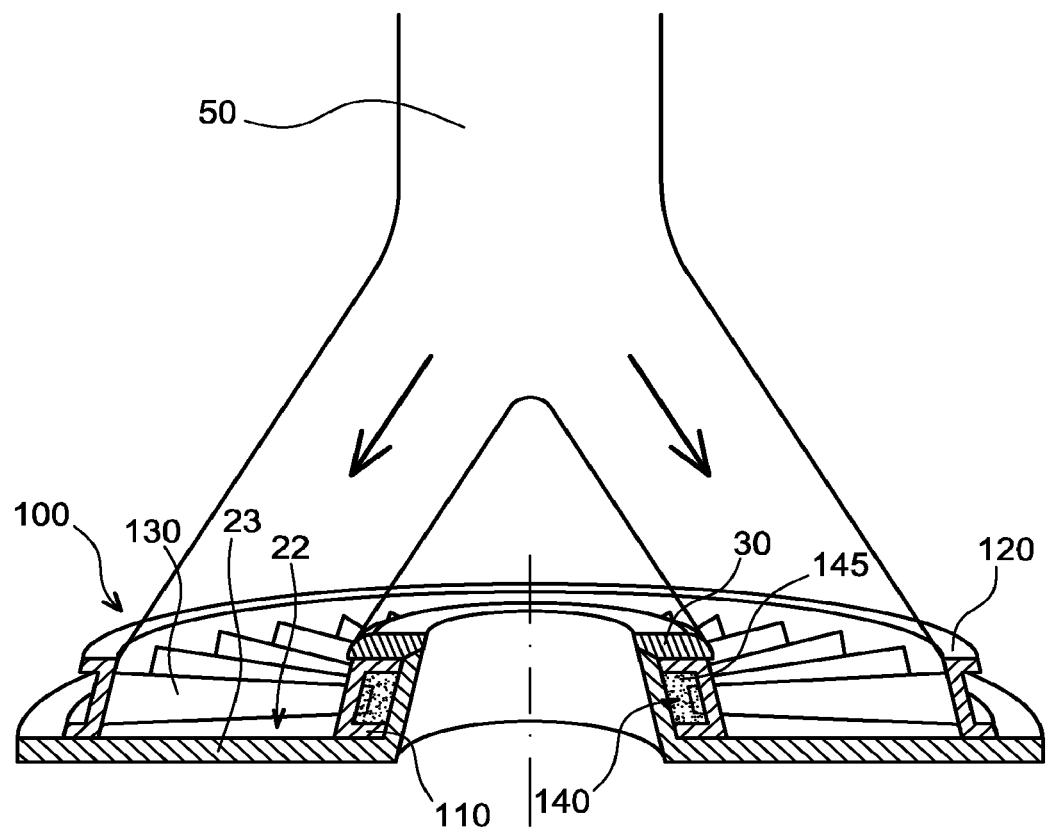
FIG. 4 shows a local heating step of an assembly method according to a fourth embodiment in which stationary hot air blowing is applied.

FIG. 4 shows a local heating step in an assembly method according to a fourth embodiment in which local heating is provided by blowing hot air 50 onto the injection zone 140. A method according to this fourth embodiment is different from the method according to the third embodiment in that it does not use a heating element 40 placed on the vanes 130 and in that the local heating is provided by a remote heating system not shown.

Such a local heating step may for example be implemented using a blower hood with a hot air flow 50 blown towards the injection zone so as to vulcanise the silicone 145. This blower hood may be a permanently installed blower system or it may be a blower device that the operator places above the assembly support 22 facing the injection zone.

Figure 5:
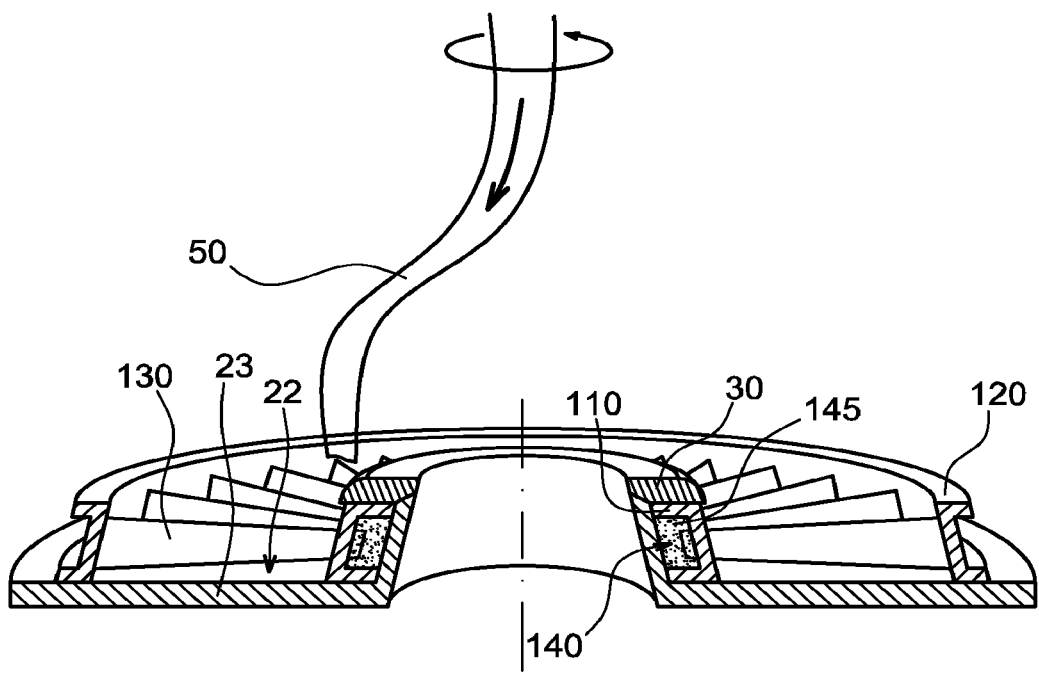
FIG. 5 shows a local heating step of an assembly method according to a fifth embodiment in which rotating hot air blowing is used.

FIG. 5 shows a local heating step in an assembly method according to a fifth embodiment of the invention in which local heating is provided by blowing rotating hot air 50 that moves along the injection zone 140. A method according to this fifth embodiment is different from the method according to the fourth embodiment in that the hot air flow 50 during the heating step is a concentrated air flow directed towards the injection zone 140 and that is free to move so as to cover the entire injection zone 140.

Such a concentrated hot air flow 50 may be provided for example by a thermal stripper, the operator applying the local heating step by blowing hot air 50 output from the thermal stripper towards the injection zone 140.

Such a concentrated hot air flow 50 may also be provided by a blowing device fitted with a mobile blowing nozzle. The blowing nozzle of such a device is designed to be positioned facing the injection zone 140 during the local heating step, with its hot air flow 50 concentrated towards the injection zone. During this blowing step, this blowing nozzle is moved along the injection zone 140 so as to cover the entire injection zone, with a circular movement. Such a movement of the blowing nozzle provides rotating blown hot air.

According to another possible embodiment, remote heating may also be provided by laser radiation or microwave radiation instead of a hot air flow 50. The constraints with such a remote heating means are similar to constraints for a hot air flow 50, and therefore will not be described more precisely in this document.

Obviously, although the first part and the second part are an inner shell 110 and an outer shell 120 of a guide vane 100 in all the embodiments described above, the use of such methods can obviously be transposed to the assembly of other turbomachine parts whenever this assembly involves the injection of an elastomer that can be vulcanised, regardless of whether or not it is a silicone 140.

Thus obviously, the invention covers assembly methods for turbomachine parts using a vulcanisable elastomer other than RTV silicone.

The invention claimed is:

1. A method for assembly of a first turbomachine part with a second turbomachine part, comprising:
   injecting a vulcanisable elastomer in an injection zone at a junction between the first and second turbomachine parts; and
   heating only of the injection zone so as to vulcanise the vulcanisable elastomer,
   wherein the heating only of the injection zone is implemented using an assembly for assembling the first and second turbomachine parts, the assembly comprising a support and a ring, the support comprising an annular support wall for the ring, the ring being formed from a first material and a second material, the first material being a thermal insulating material and the second material being a heat conducting material.

2. The assembly method according to claim 1, wherein the first and second turbomachine parts are two annular parts configured to form a turbomachine guide vane after assembly.

3. The method according to claim 1, wherein the assembly comprises a heating system comprising a heating zone and that is associated with the support such that the heating zone is facing the injection zone while the heating step is being performed.

4. The method according to claim 3, wherein the assembly also acts as an assembly support used during the injecting of the vulcanisable elastomer.

5. The method according to claim 1, wherein the heating step is implemented with a heating element previously placed on the first and second turbomachine parts close to the injection zone.

6. The method according to claim 1, wherein the heating is implemented using a remote heating system.

7. The method according to claim 6, wherein the remote heating system is selected among the group consisting of a hot air blowing system at the injection zone, laser radiation and microwave radiation.

8. The method according to claim 1, wherein the vulcanisable elastomer is a silicone that can be vulcanised at ambient temperature called an RTV silicone.

9. A method for assembly of a first turbomachine part with at least one second turbomachine part, comprising:
   injecting a vulcanisable elastomer in an injection zone at a junction between the first and second turbomachine parts; and
   applying local heating at first portions of the first and second turbomachine parts, the first portions comprising the injection zone so as to vulcanise the vulcanisable elastomer, no heating being applied to second portions of the first and second turbomachine parts,
   wherein the local heating step at first portions of the first and second turbomachine parts is implemented using an assembly for assembling the first and second turbomachine parts, the assembly comprising a support and a ring, the support comprising an annular support wall for the ring, the ring being formed from a first material and a second material, the first material being a thermal insulating material and the second material being a heat conducting material.

10. A method for assembly of a first turbomachine part with a second turbomachine part, comprising:
    injecting a vulcanisable elastomer in an injection zone at a junction between the first and second turbomachine parts; and
    heating only of the injection zone so as to vulcanise the vulcanisable elastomer,
    wherein the vulcanisable elastomer is a silicone that can be vulcanised at ambient temperature called an RTV silicone, and
    wherein the heating only of the injection zone is performed using an assembly comprising a support and a ring, the support comprising an annular support wall for the ring, the ring being formed from a first material and second materials, the first material being a thermal insulating material and the second material being a heat conducting material.

* * * * *